US010859262B2

(12) United States Patent
Arava et al.

(10) Patent No.: US 10,859,262 B2
(45) Date of Patent: Dec. 8, 2020

(54) METHOD AND APPARATUS FOR WASTE COMBUSTION

(71) Applicant: Worcester Polytechnic Institute, Worcester, MA (US)

(72) Inventors: Shivaprasad Arava, Worcester, MA (US); Kemal S. Arsava, Worcester, MA (US); Ali S. Rangwala, Worcester, MA (US); Hayri Sezer, Worcester, MA (US); Apoorv Walawalkar, Worcester, MA (US); Vasudevan Raghavan, Madras (IN)

(73) Assignee: Worcester Polytechnic Institute, Worcester, MA (US)

( * ) Notice: Subject to any disclaimer, the term of this patent is extended or adjusted under 35 U.S.C. 154(b) by 396 days.

(21) Appl. No.: 15/825,514

(22) Filed: Nov. 29, 2017

(65) Prior Publication Data
US 2018/0149356 A1  May 31, 2018

Related U.S. Application Data

(60) Provisional application No. 62/427,990, filed on Nov. 30, 2016.

(51) Int. Cl.
*F23G 7/05* (2006.01)
*F23G 7/14* (2006.01)
(Continued)

(52) U.S. Cl.
CPC .............. *F23G 7/05* (2013.01); *F23G 5/008* (2013.01); *F23G 5/46* (2013.01); *F23G 7/14* (2013.01);
(Continued)

(58) Field of Classification Search
CPC ...... F23G 7/00; F23G 7/05; F23G 7/14; F23G 5/006; F23G 5/008; F23G 5/46;
(Continued)

(56) References Cited

U.S. PATENT DOCUMENTS

| 4,025,286 A | * | 5/1977 | Husselmann | ......... F24H 9/1836 |
|  |  |  |  | 431/171 |
| 4,493,638 A | * | 1/1985 | Scammell | ................. F23G 7/08 |
|  |  |  |  | 431/171 |

(Continued)

OTHER PUBLICATIONS

"Introduction to Fluid Mechanics, Second Edition", Fox, R. W. et al., John Wiley & Sons, pp. 613-616, 1978. (Year: 1978).*

*Primary Examiner* — Steven B McAllister
*Assistant Examiner* — Daniel E. Namay
(74) *Attorney, Agent, or Firm* — Armis IP Law, LLC

(57) ABSTRACT

A toxic waste incinerator is capable of enhanced combustion of hazardous waste (oil contaminated sand, human waste, garbage, etc.) utilizing immersed non-combustible and thermally conductive objects for increasing heat feedback from the flames to the unburned fuel, while air inlets are used to optimize the air entrainment rate to enhance the burning efficiency. The burning rate of a fluidic mass such as a sand-oil mixture is enhanced using immersed conductive objects (copper rods) which enable rapid heat-up of the flame exposed to the upper surface of the rod and transmits heat back into the sand. Consequent conduction of heat to the porous media through the lower portion of the immersed rod significantly increases vaporization and therefore the burning rate. Incineration may be performed on a transient, exigent basis as with hazardous waste and oil spills, or as part of a permanent fixture for receiving an ongoing waste stream.

19 Claims, 2 Drawing Sheets

(51) Int. Cl.
  *F23G 5/46* (2006.01)
  *F23G 5/00* (2006.01)
  *F23G 7/00* (2006.01)
(52) U.S. Cl.
  CPC ............ *F23G 7/00* (2013.01); *F23G 2202/20* (2013.01); *F23G 2205/12* (2013.01); *F23G 2206/10* (2013.01); *F23G 2206/203* (2013.01); *F23G 2207/101* (2013.01); *F23N 2241/18* (2020.01)
(58) Field of Classification Search
  CPC ............. F23G 2202/20; F23G 2205/12; F23G 2206/10; F23G 2206/203; F23N 2241/18
  USPC ............. 431/164, 8, 171; 110/323, 326, 347
  See application file for complete search history.

(56) References Cited

U.S. PATENT DOCUMENTS

| | | | | |
|---|---|---|---|---|
| 4,934,927 A | * | 6/1990 | Swiatosz | F23D 14/70 |
| | | | | 431/170 |
| 2004/0018460 A1 | * | 1/2004 | Korwin | F23G 7/065 |
| | | | | 431/5 |
| 2016/0123582 A1 | * | 5/2016 | Rangwala | F23D 5/123 |
| | | | | 588/320 |
| 2017/0292699 A1 | * | 10/2017 | Lee | F23G 5/027 |

* cited by examiner

METHOD AND APPARATUS FOR WASTE COMBUSTION

RELATED APPLICATIONS

This application claims the benefit under 35 U.S.C. § 119(e) of U.S. Provisional Patent Application No. 62/427,990 filed Nov. 30, 2016, entitled "IMMERSED CONDUCTIVE OBJECTS FOR HAZARDOUS WASTE COMBUSTION," incorporated herein by reference in entirety.

BACKGROUND

Hazardous waste handling has become increasingly scrutinized as longstanding industrial practices and materials are called into question. Incineration has gained popularity as an alternative to dumping. Toxic waste incineration has focused on incinerators with nonflammable immersed objects and cleaning of contaminated porous media. However, existing burner designs (industrial and power plant boilers and waste incinerators) require costly and mechanically troublesome injection nozzles or other means to disperse ("atomize") the fuel so it can be pre-heated and vaporized or pyrolyzed prior to actual combustion in an airstream. Further, in existing burners, most of the heat transferred from the flame is lost to the environment via convection and gas radiation losses. Only a small fraction of this heat goes back to the fuel, which sustains vaporization of the fuel and consequently combustion. Due to this reason, the average burning rate of waste vaporization is quite low.

SUMMARY

A toxic waste incinerator is capable of enhanced combustion of hazardous waste (oil contaminated sand, human waste, garbage, etc.) utilizing immersed non-combustible and thermally conductive objects for increasing heat feedback from the flames to the unburned fuel, while air inlets are used to optimize the air entrainment rate to enhance the burning efficiency. The burning rate of a fluidic mass such as a sand-oil mixture is enhanced using immersed conductive objects (copper rods) which enable rapid heat-up of the flame exposed to the upper surface of the rod and transmits heat back into the sand. Consequent conduction of heat to the porous media through the lower portion of the immersed rod significantly increases vaporization and therefore the burning rate. Incineration may be performed on a transient, exigent basis as with hazardous waste and oil spills, or as part of a permanent fixture for receiving an ongoing waste stream.

Configurations herein are based, in part, on the observation that combustion of waste materials is an effective and inexpensive process for reducing or eliminating the waste. Combustion reduces the waste materials to a gaseous form where it can be vented to the atmosphere. Unfortunately, conventional approaches to waste combustion suffer from the shortcoming that incomplete or inefficient combustion can result from failure to attain sufficiently high combustion temperatures. Lower temperature combustion increases pollution as combusted gases carry away solid particles and partially combusted gases. Accordingly, configurations herein substantially overcome the above described shortcomings by conducting heat throughout a fluidic mass for effecting a higher temperature combustion to completely burn waste into less harmful gases without causing solids and partially combusted pollutants to become airborne.

In a particular configuration, a method for expediting combustion of toxic waste, spills, and mixes of toxic and benign substances includes aggregating a fluidic mass of at least partially combustible materials, and inserting a thermally conductive media partially into the fluidic mass. The fluidic mass may result from a spill of liquid onto particle solids, as in sand or soil, or a spill/emulsion of mixed liquids, such as water and oil. Heat or combustive means apply an ignition source to the fluidic mass such that the thermally conductive media absorbs heat from the combustion. The thermally conductive media is an elongated tube or rod adapted for redirecting and conducting heat into the fluidic mass into which it is inserted, and may be a copper cylinder or a copper tube having air inlets to facilitate thermal transfer and oxygen supply.

A fluidic mass including solids and liquids has a network of thermally conductive rods or tubes inserted into the mass for conducting heat of combustion through the fluidic mass. Heat of combustion on a surface or oxygen rich area of a waste mass travels through the conductive rods to heat the waste mass for a higher temperature combustion to more thoroughly evaporate the waste. Incomplete and lower temperature combustion that causes smoldering and incomplete combustion is avoided by redirecting the heat of combustion through the rods to uncombusted waste. The fluidic mass includes liquid entrenched solid waste, i.e. human trash and hazardous waste spills such as oil impregnated soil and sand. A combustion apparatus and/or site involves inserting the rods through the fluidic waste, and igniting the waste to commence combustion. The heating from the rods draws the liquid upwards via capillary action, and additional air may be forced through the rods to facilitate oxygen availability.

In further detail, configurations herein depict a method for expediting combustion, including aggregating a fluidic mass of at least partially combustible materials, and inserting a thermally conductive media partially into the fluidic mass. The fluidic mass is any comingled arrangement of solid waste interspersed with liquid components, and preferable having a porosity to facilitate heat and gaseous transfer. An ignition source is applied to the fluidic mass such that the thermally conductive media absorbs heat from the combustion for transferring thermal energy through the thermally conductive media to unignited portions of the fluidic mass.

The method may be demonstrated in a corresponding apparatus, such as a waste incinerator apparatus, including thermally conductive media defined by at least one elongated thermally conductive rod adapted for insertion into a fluidic mass of waste materials. The thermally conductive rod has a width/diameter and depth for conducting heat along a length to a subsurface region of the fluidic mass. The ignition source commences combustion of the fluidic mass, such that the thermally conductive media absorbs heat from the combustion for transferring thermal energy through the thermally conductive media to unignited portions of the fluidic mass. In effect, the thermally conductive media redirects heat downwards into the subsurface fluidic mass for aiding combustion by increased temperature, lowered viscosity and capillary action for drawing the liquid upwards.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example of thermally conductive rods inserted into a fluidic mass of commingled liquid and solid waste. The waste may be an accidental spill of liquid, toxic waste onto a natural or organic sand or soil, or may be a direct stream of trash, rubbish and/or septic matter that necessarily results from human inhabitation. Conventional oil spills are typically handled with mechanical measures such as shovels, booms and skimmers to segregate the contaminated area, or with chemical and biological methods that degrade and disintegrate the petroleum content. Conventional waste disposal, in developing regions, are often handled by ad-hoc and makeshift burnings that fail to approach an optimal burn temperature, resulting in a smoky, smoldering exhaust plume of solids and contaminants.

Figure 1:
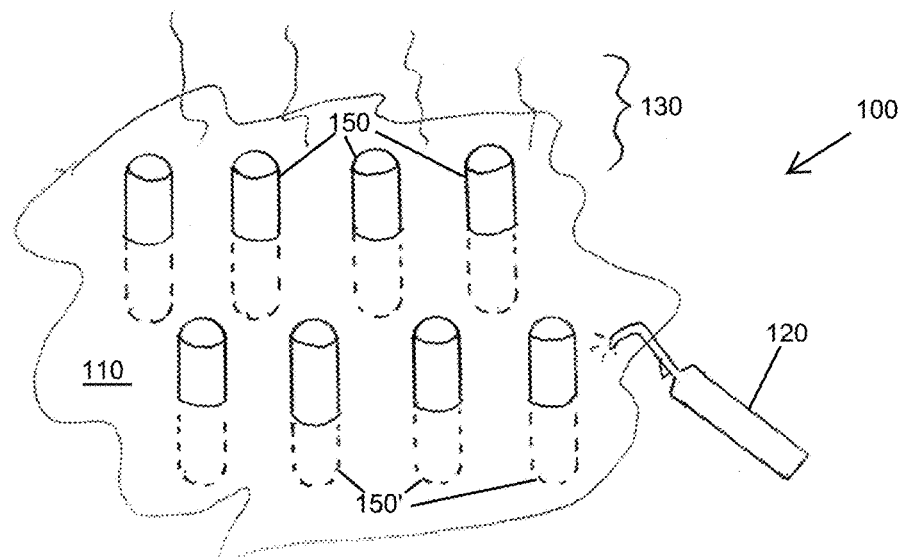
FIG. 1 is a context view of a combustion or burn apparatus according to configurations herein.

FIG. 1 is a context view of a combustion or burn apparatus according to configurations herein. Referring to FIG. 1, in a burn environment 100, a fluidic mass 110 includes waste materials for combustion and elimination. The waste materials may be transient, as in a hazardous waste or oil spill, or an ongoing stream, such as residential trash or human septic waste. A waste source aggregates the fluidic mass 110 of at least partially combustible materials, into which is inserted a thermally conductive media 150. The thermally conductive media, in an example configuration, may be an elongated rod adapted for insertion into a mixture of liquid waste and solid, such as an oil spill. The thermally conductive media 150 is inserted such that an inserted portion 150' achieves a predetermined depth, over which thermal conduction is achieved.

Following insertion of the rods, an ignition source 120 is applied to the fluidic mass 110, causing ignition, flames, and a plume of resultant evaporative gases 130 typical of combustion. The thermally conductive media absorbs heat from the combustion for transferring thermal energy through the thermally conductive media 150, 150' to unignited portions of the fluidic mass 110. By increasing the heat at the lower, submerged levels of the fluidic mass 110 defined by the inserted portion 150', the heat conducted by the inserted portion 150' increases temperatures for combustion below the conductive member 150 disposed in the open flames above. The inserted rods therefore provide heat transfer for increasing a temperature of the combustible liquid in the fluidic mass. Transfer of heat reduces the viscosity of the combustible liquid for upward transport via capillary action, bringing the liquid in the fluidic mass 110 where it can be more completely combusted by the higher temperature.

Figure 2:
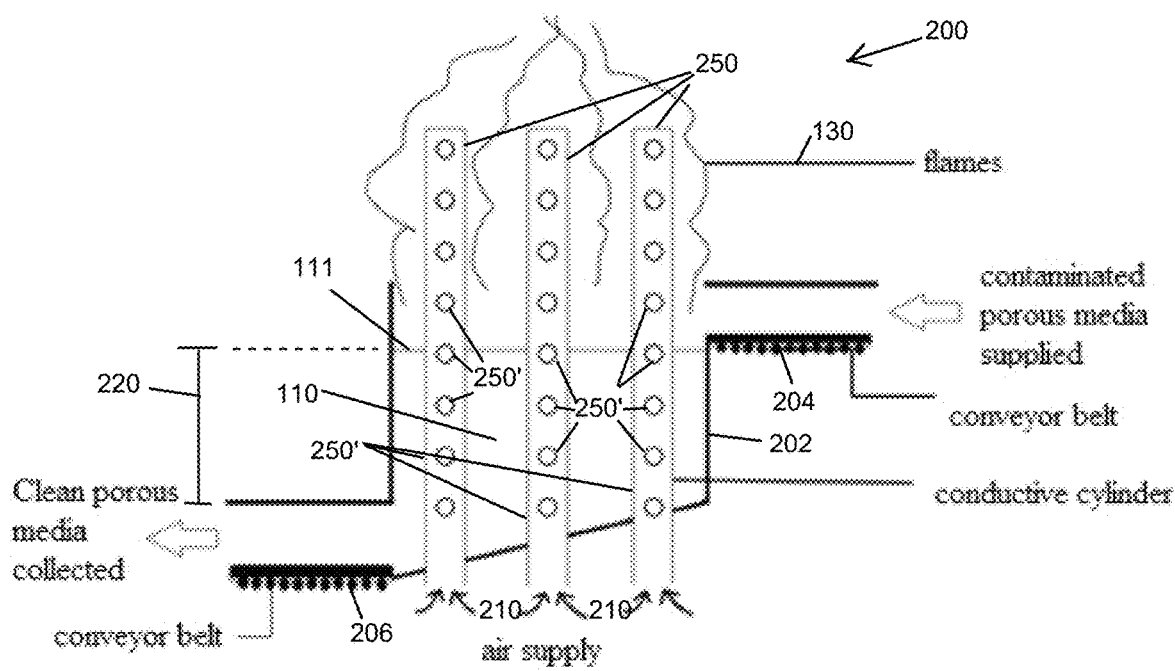
FIG. 2 is a schematic of a hazardous waste incinerator according to the approach of FIG. 1.

FIG. 2 is a schematic of a hazardous waste incinerator according to the approach of FIG. 1. In the incinerator 200 of FIG. 2, the thermally conductive media 150 is defined by a network of elongated tubes 250 adapted for redirecting and conducting heat into the fluidic mass 110 into which it is inserted. In the example configuration shown, the thermal conductive media is a copper cylinder having a bore therethrough for conveying air and oxygen 210 to the combustion. FIG. 2 shows the thermally conductive media 150 as a copper tube having air inlets 250' to allow the air and/or oxygen supply 210 to infiltrate the fluidic media 110.

In operation, the incinerator 200 defines an incinerator body 202 having a supply conveyor 204 and an egress conveyor 206. The supply conveyor 204 introduces the fluidic mass 110 into the incinerator body, and ideally maintains the fluidic mass 110 at a working level 111. During incineration, the combusting, fluidic mass 110 evacuates downward, as portions are given off as evaporated gases 130 and exhaust. A working depth 220 of the incinerator body 202, defined by the distance from the working level 111 to the egress conveyor 206, allows time for heat transferred through the rods to completely or near completely incinerate the fluidic mass 110. Remaining uncombusted materials exit on the egress conveyor 206, at substantially reduced volume and weight relative to the supply.

The incinerator 200 is a stationary fixture amenable to a regular stream of human waste and rubbish. In developing regions where an infrastructure of trash disposal is not yet established, localized incinerators 200 are an attractive alternative to multiple smaller burns because the ad-hoc methods used for individualized burns may not achieve a sufficient temperature. Rather, local burns tend to achieve only a smoldering burn which generates a "smoky" plume depicting incomplete combustion.

The stream of waste may any suitable agglomeration of human generated excess, resulting from food preparation and disposal, packaging, and similar household excess typically handled by trash collection in more industrialized areas. In regions of unestablished plumbing and septic processing, incineration provides an outlet for these wastes as well. A porosity in the waste is beneficial for airflow and capillary flow. The fluidic mass 110 may comprise contaminated porous media including flammable toxic waste. Generally, the fluidic mass 110 includes a liquid component responsive to vaporization, such that the liquid component is dispersed throughout solid components in the fluidic mass. Fluidic mass 110 therefore refers to any agglomeration of various waste for which disposal is sought.

Figure 3:
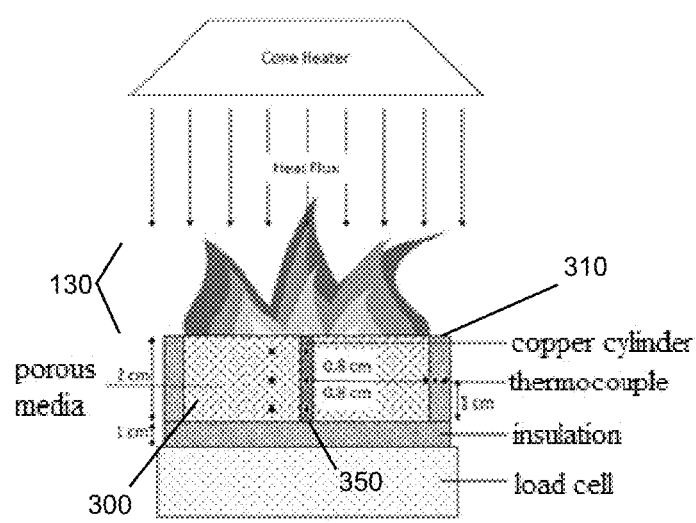
FIG. 3 shows an incineration apparatus as in FIG. 2 having particular sized conduction rods.

FIG. 3 shows an incineration apparatus as in FIG. 2 having particular sized conduction rods. Referring to FIGS. 1-3, the thermally conductive medium 150 is applicable to transient contexts, such as oil and hazmat spills, and fixed installations for handling a recurring stream of waste, as depicted by the incinerator 200 of FIG. 2. The thermally conductive medium 150 may also be employed by a dispersion of rods over a spill area. In such a toxic or hazmat spill response, the fluidic mass may be petroleum entrenched sand or soil, or may include an emulsion of flammable and non-flammable liquids, such as an oil spill in sea water. The heat transferred by the thermally conductive medium, in either scenario, enhances heat to bring combustible material to the temperature of combustion.

FIG. 3 shows an example of a mixture 300 of sand and crude oil emulsion having a depth of 2 cm in a test pan 310. Thermocouples are placed in the test pan 310 to measure the temperature variations. The thermally conductive media 150 is defined by a highly conductive copper rod 350 of 2 cm height and 1 cm diameter immersed at the center of fuel mixture 300 in the pan 310.

Figure 4:
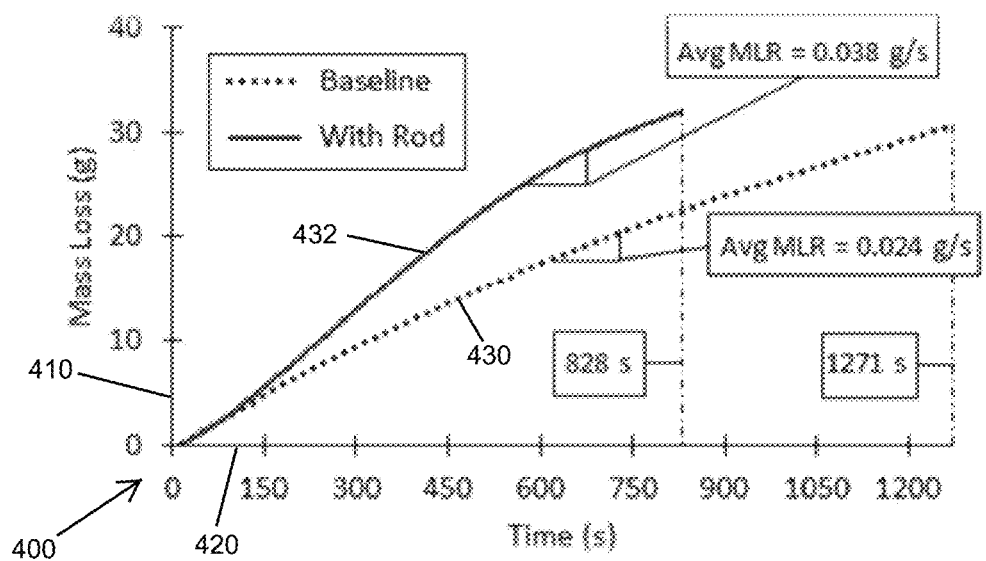
FIG. 4 is a graph of combustion effectiveness in the incinerator of FIG. 3.

FIG. 4 is a graph of combustion effectiveness in the incinerator of FIG. 3. Referring to FIG. 4, a comparison graph 400 of burn effectiveness is shown based on a conversion rate of mass to vapor and expelled burn products. A mass loss axis 410 shows a quantity of the combusted mass that is converted or vaporized into less harmful gases and matter, based on burning duration shown on time axis 420. A baseline 430 shows the rate of a standing quantity of a sand/oil mixture (fuel), and an immersed rod (cylinder) result 432 depicts performance with an inserted copper rod as in FIG. 3. As shown in FIGS. 3 and 4, the immersed cylinder heats the fuel mixture and assists in reaching the required ignition temperature for the fuel in lesser time. Fuel with the immersed cylinder achieves ignition with flames around 540 s and burns the fuel. In contrast, in the baseline case, fuel exposed to heat flux is evaporated without ignition. Comparing both the cases, the average mass loss rate of the fuel mixture with immersed cylinder 432 (0.038 g/s) is higher compared with the baseline case 430 (0.024 g/s). Therefore, the immersed cylinder case is 58% more efficient and takes less time in cleaning the contaminants than baseline case.

A particular practical implementation of the disclosed approach includes combustion of toxic waste, spills, and mixed toxic/benign aggregations includes aggregating a fluidic mass of at least partially combustible materials, and inserting a thermally conductive media partially into the fluidic mass. The fluidic mass may result from a spill of liquid onto particle solids, as in sand or soil, or a spill/emulsion of mixed liquids, such as water and oil. Heat or combustive means apply an ignition source to the fluidic mass such that the thermally conductive media absorbs heat from the combustion. The thermally conductive media is an elongated tube adapted for redirecting and conducting heat into the fluidic mass into which it is inserted, and may be a copper cylinder or a copper tube having air inlets to facilitate thermal transfer and oxygen supply.

In another implementation, an incinerator as in FIG. 2 is deployable at multiple locations in densely populated areas for residential waste. Such an incinerator may take the form of a shipping container or similar construction adapted to truck transport, having an approximate size of 40' long, 8' wide and about 8'6" in height. Tactical implementation in military contexts is also a beneficial deployment.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for expediting combustion, comprising:
aggregating a fluidic mass of at least partially combustible materials;
inserting a thermally conductive media into the fluidic mass, the thermally conductive media having a bore therethrough for conveying oxygen to the combustion, the fluidic mass including comingled liquid components interspersed with solids having a porosity for facilitating gaseous heat transfer; and
applying an ignition source to the fluidic mass such that the thermally conductive media absorbs heat from the combustion for transferring thermal energy through the thermally conductive media to unignited portions of the fluidic mass.

2. The method of claim 1 wherein the thermally conductive media is an elongated rod adapted for insertion into a mixture of liquid waste and solids.

3. The method of claim 2 wherein the inserted rods provide heat transfer for increasing a temperature of the combustible liquid, heat transfer reducing the viscosity of the combustible liquid for upward transport via capillary action.

4. The method of claim 1 wherein the thermally conductive media is an elongated tube adapted for redirecting and conducting heat into the fluidic mass into which it is inserted.

5. The method of claim 4 wherein the thermal conductive media is a copper cylinder having a bore therethrough for conveying oxygen to the combustion.

6. The method of claim 4 wherein the thermally conductive media is a copper tube having air inlets.

7. The method of claim 1 wherein the fluidic mass is a contaminated porous media including flammable toxic waste.

8. The method of claim 7 wherein the fluidic mass includes petroleum entrenched sand.

9. The method of claim 1 wherein the fluidic mass includes an emulsion of flammable and non-flammable liquids.

10. The method of claim 1 wherein fluidic mass includes a liquid component responsive to vaporization, the liquid component dispersed throughout solid components in the fluidic mass.

11. A waste incinerator apparatus, comprising:
thermally conductive media defined by at least one elongated thermally conductive tube adapted for insertion into a fluidic mass of waste materials,
the thermally conductive tube having a width and depth adapted for redirecting and conducting heat along a length to a subsurface region of the fluidic mass into which it is inserted and having a bore therethrough for conveying oxygen to the combustion; and
an ignition source for commencing combustion of the fluidic mass, the combustion such that the thermally conductive media absorbs heat from the combustion for transferring thermal energy through the thermally conductive media to unignited portions of the fluidic mass.

12. The apparatus of claim 11 wherein the fluidic mass is a contaminated porous media including flammable toxic waste.

13. The apparatus of claim 12 wherein the fluidic mass includes petroleum entrenched sand.

14. The apparatus of claim 11 wherein the fluidic mass includes an emulsion of flammable and non-flammable liquids.

15. The apparatus of claim 11 wherein the thermally conductive media is a copper cylinder.

16. The apparatus of claim 11 wherein the inserted rods provide heat transfer for increasing a temperature of the combustible liquid, heat transfer reducing the viscosity of the combustible liquid for upward transport via capillary action.

17. The apparatus of claim 11 further comprising an incinerator body adapted to maintain the fluidic mass at a working level, the thermally conductive media extending from the working level through a depth maintained by the incinerator body, the thermally conductive media operable for transferring thermal energy from combustion at the working level along the depth.

18. The apparatus of claim 17 further comprising:
a supply conveyor for maintaining the fluidic mass at the working level in the incinerator body; and
an egress conveyor for transporting combusted materials from the incinerator body.

19. A method for expediting combustion, comprising:
aggregating a fluidic mass of at least partially combustible materials;
inserting a thermally conductive media into the fluidic mass, the thermally conductive media defined by an elongated tube adapted for insertion into the fluidic mass and having a bore therethrough for conveying oxygen to the combustion; and
applying an ignition source to the fluidic mass such that the thermally conductive media absorbs heat from the combustion for transferring thermal energy through the thermally conductive media to unignited portions of the fluidic mass.

\* \* \* \* \*